United States Patent
Chittilappilly et al.

(10) Patent No.: US 12,265,732 B1
(45) Date of Patent: Apr. 1, 2025

(54) REFRESH DURING POWER STATE CHANGES

(71) Applicant: Advanced Micro Devices, Inc., Santa Clara, CA (US)

(72) Inventors: Jean J. Chittilappilly, Maynard, MA (US); Kevin M. Brandl, Austin, TX (US); Jing Wang, Austin, TX (US); Kedarnath Balakrishnan, Bangalore (IN)

(73) Assignee: Advanced Micro Devices, Inc., Santa Clara, CA (US)

( * ) Notice: Subject to any disclaimer, the term of this patent is extended or adjusted under 35 U.S.C. 154(b) by 7 days.

(21) Appl. No.: 18/375,030

(22) Filed: Sep. 29, 2023

(51) Int. Cl.
G06F 3/06 (2006.01)

(52) U.S. Cl.
CPC .......... G06F 3/0658 (2013.01); G06F 3/0619 (2013.01); G06F 3/0634 (2013.01); G06F 3/0671 (2013.01)

(58) Field of Classification Search
CPC ........ G05B 2219/34193; G11C 11/401; G11C 11/402; G11C 11/403; G11C 11/40607; G11C 11/40611; G11C 11/40615; G11C 12/0033; G11C 29/08; G11C 2211/406; G09G 3/3618
See application file for complete search history.

(56) References Cited

U.S. PATENT DOCUMENTS

| | | | |
|---|---|---|---|
| 10,446,215 B1* | 10/2019 | Hughes | G06F 3/0673 |
| 2005/0105369 A1* | 5/2005 | Schoenfeld | G11C 5/14 |
| | | | 365/227 |
| 2005/0140685 A1* | 6/2005 | Garg | G09G 5/363 |
| | | | 345/543 |
| 2005/0276142 A1* | 12/2005 | Pelley | G11C 11/40607 |
| | | | 365/222 |
| 2007/0121406 A1 | 5/2007 | Oh | |
| 2017/0351450 A1 | 12/2017 | Brandl et al. | |
| 2019/0189194 A1 | 6/2019 | Kim et al. | |
| 2022/0121263 A1 | 4/2022 | Mozak et al. | |
| 2023/0120654 A1 | 4/2023 | Hollis et al. | |

FOREIGN PATENT DOCUMENTS

| | | |
|---|---|---|
| KR | 10-2022-013021 A | 9/2022 |
| WO | 2010-093356 A1 | 8/2010 |

OTHER PUBLICATIONS

International Search Report and Written Opinion for International Application No. PCT/US2024/034313 mailed Oct. 10, 2024, 6 pages.

* cited by examiner

*Primary Examiner* — Khoa D Doan
(74) *Attorney, Agent, or Firm* — Polansky & Associates, P.L.L.C.; Paul J. Polansky

(57) ABSTRACT

A data processor that is operable to be coupled to a memory includes a memory operation array, a controller, a refresh logic circuit, and a selector. The memory operation array is for storing memory operations for a first power state of the memory. The controller is responsive to a power state change request to execute a plurality of memory operations from the memory operation array when the first power state is selected. The refresh logic circuit generates refresh cycles periodically for the memory. The selector is for multiplexing the refresh cycles with the memory operations during a power state change to the first power state.

20 Claims, 6 Drawing Sheets

REFRESH DURING POWER STATE CHANGES

BACKGROUND

Computer systems typically use inexpensive and high density dynamic random access memory (DRAM) chips for main memory. Most DRAM chips sold today are compatible with various double data rate (DDR) DRAM standards promulgated by the Joint Electron Devices Engineering Council (JEDEC). The flow of data going to and from the DRAM over a memory bus is typically managed by a memory controller. The memory controller receives memory access requests from the host system, stores them in a queue, and dispatches them to the DRAM in an order selected by an arbiter in an order chosen to improve efficiency of the memory bus.

Figure 1:
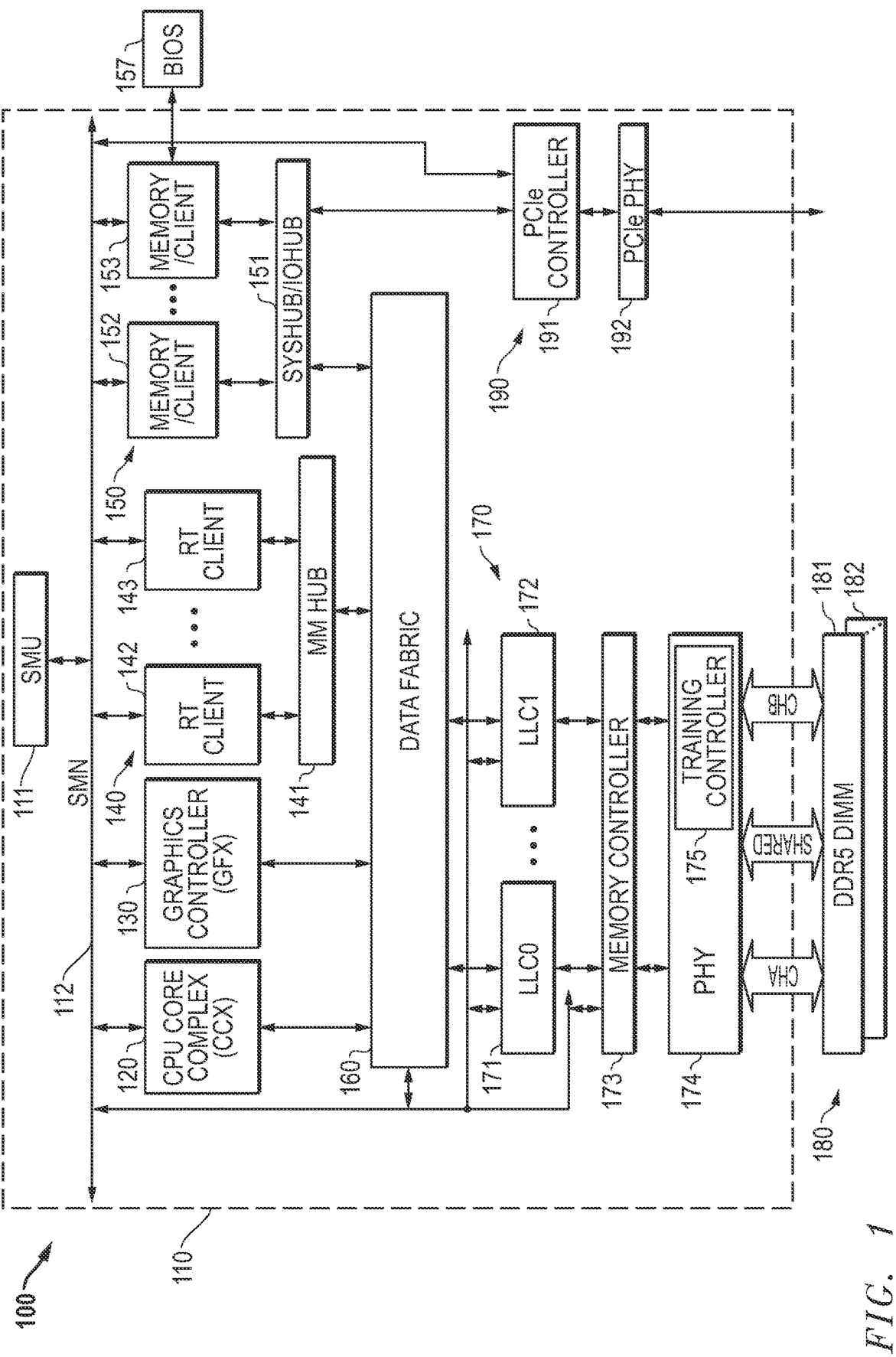
FIG. 1 illustrates in block diagram form a data processing system according to some implementations.

In the following description, the use of the same reference numerals in different drawings indicates similar or identical items. Unless otherwise noted, the word "coupled" and its associated verb forms include both direct connection and indirect electrical connection by means known in the art, and unless otherwise noted any description of direct connection implies alternate implementations using suitable forms of indirect electrical connection as well. The following Detailed Description is directed to electronic circuitry, and the description of a block shown in a drawing figure implies the implementation of the described function using suitable electronic circuitry, unless otherwise noted.

DETAILED DESCRIPTION OF ILLUSTRATIVE IMPLEMENTATIONS

A memory controller and its associated DRAM memory may be put in different power states to increase performance or to reduce power consumption. Power states are employed for many parts of a computer system, in which the different power states provide different operating capacities, such as processing power for a processor core, or signaling data rate for a communication bus. One popular standard for managing such power modes is the Advanced Configuration and Power Interface (ACPI), which is a power management and configuration standard for computers such as personal computers (PCs) and servers. ACPI allows the computer operating system to control the amount of power each device is given by changing the device's operating mode from among a limited set of modes. For example, such changes may include changing the device's clock speed to a higher or lower frequency, or putting devices into standby or power-off modes.

Modern DRAMs, such as double data rate, version five (DDR5) DRAMs have a large set of operating parameters that must be trained during operation and a large number of mode registers that must be programmed for each particular operating speed. The large number of these operating parameters and mode registers causes the mode change sequence to be so long that some or all of the memory cells must be refreshed during the sequence. Performing refreshes under these conditions is difficult to do without either risking the loss of data in the DRAM, or wasting valuable time refreshing the memory cells do not need to be refreshed.

A data processor that is operable to be coupled to a memory includes a memory operation array, a controller, a refresh logic circuit, and a selector. The memory operation array is for storing memory operations for a first power state of the memory. The controller is responsive to a power state change request to execute a plurality of memory operations from the memory operation array when the first power state is selected. The refresh logic circuit generates refresh cycles periodically for the memory. The selector is for multiplexing the refresh cycles with the memory operations during a power state change to the first power state.

A data processing system includes a data processor and a memory coupled to the data processor. The data processor includes a memory operation array, a controller, a refresh logic circuit, and a selector. The memory operation array is for storing memory operations for a first power state of the memory. The controller is responsive to a power state change request to execute a plurality of memory operations from the memory operation array when the first power state is selected. The refresh logic circuit generates refresh cycles periodically for the memory. The selector is for multiplexing the refresh cycles with the memory operations during a power state change to the first power state.

A method for accessing a memory includes storing memory operations for a first power state of the memory in a memory operation array. A plurality of memory operations from the memory operation array are executed responsive to a power state change request to the first power state. Refresh cycles are periodically generated for the memory. The refresh cycles with the memory operations during a power state change to the first power state.

FIG. 1 illustrates in block diagram form a data processing system 100 according to some implementations. Data processing system 100 includes a data processor 110 in the form of a system-on-chip (SOC), a basic input/output system (BIOS) memory 157 labelled "BIOS", and a memory 180 in the form of an external Double Data Rate, version 5, synchronous dynamic random-access memory (DDR5 SDRAM) system. Many other components of an actual data processing system are typically present but are not relevant to understanding the present disclosure and are not shown in FIG. 1 for ease of illustration.

Data processor 110 includes generally a system management unit (SMU) 111, a system management network (SMN) 112, a data processor core 120 in the form of a central processing unit (CPU) core complex labelled "CCX", a graphics controller 130 labelled "GFX", a real-time client subsystem 140, a memory/client subsystem 150, a data fabric 160, a memory channel 170 to memory 180, and a Peripheral Component Interface Express (PCIe) subsystem 190. As will be appreciated by a person of ordinary skill, data processor 110 may not have all of these elements present in every implementation and, further, may have additional elements included therein.

SMU 111 is bidirectionally connected to the major components in data processor 110 over SMN 112. SMN 112 forms a control fabric for data processor 110. SMU 111 is a local controller that controls the operation of the resources on data processor 110 and synchronizes communication among them. SMU 111 manages power-up sequencing of the various processors on data processor 110 and controls multiple off-chip devices via reset, enable, and other signals. SMU 111 includes one or more clock sources (not shown), such as a phase locked loop (PLL), to provide clock signals for each of the components of data processor 110. SMU 111 also manages power for the various processors and other functional blocks, and may receive measured power consumption values from CPU cores in data processor core 120 and graphics controller 130 to determine appropriate P-states.

Data processor core 120 includes a set of CPU cores, each of which is bidirectionally connected to SMU 111 over SMN 112. Each CPU core may be a unitary core only sharing a last-level cache with the other CPU cores, or may be combined with some but not all of the other cores in clusters.

Graphics controller 130 is bidirectionally connected to SMU 111 over SMN 112. Graphics controller 130 is a high-performance graphics processing unit capable of performing graphics operations such as vertex processing, fragment processing, shading, texture blending, and the like in a highly integrated and parallel fashion. In order to perform its operations, graphics controller 130 requires periodic access to external memory. In the implementation shown in FIG. 1, graphics controller 130 shares a common memory subsystem with CPU cores in data processor core 120, an architecture known as a unified memory architecture. Because data processor 110 includes both a CPU and a GPU, it is also referred to as an accelerated processing unit (APU).

Real-time client subsystem 140 includes a set of real-time clients such as representative real time clients 142 and 143, and a memory management hub 141 labelled "MM HUB". Each real-time client is bidirectionally connected to SMU 111 over SMN 112, and to memory management hub 141. Real-time client subsystem 140 could include any type of peripheral controller that requires periodic movement of data, such as an image signal processor (ISP), an audio coder-decoder (codec), a display controller that renders and rasterizes objects generated by graphics controller 130 for display on a monitor, and the like.

Memory/client subsystem 150 includes a set of memory elements or peripheral controllers such as memory/client devices 152 and 153, and a system and input/output hub 151 labeled "SYSHUB/IOHUB". Each memory/client device is bidirectionally connected to SMU 111 over SMN 112, and to system and input/output hub 151. Memory/client devices 152 and 153 are circuits that either store data or require access to data on an aperiodic fashion, such as a non-volatile memory, a static random-access memory (SRAM), an external disk controller such as a Serial Advanced Technology Attachment (SATA) interface controller, a universal serial bus (USB) controller, a system management hub, and the like. In data processor 110, memory/client device 153 is adapted to connect to an external memory storing a basic input/output system (BIOS), that is, BIOS memory 157.

Data fabric 160 is an interconnect that controls the flow of traffic in data processor 110. Data fabric 160 is bidirectionally connected to SMU 111 over SMN 112, and is bidirectionally connected to data processor core 120, graphics controller 130, memory management hub 141, system and input/output hub 151. Data fabric 160 includes a crossbar switch for routing memory-mapped access requests and responses between any of the various devices of data processor 110. It includes a system memory map, defined by a basic input/output system (BIOS), for determining destinations of memory accesses based on the system configuration, as well as buffers for each virtual connection.

Memory channel 170 is a circuit that controls the transfer of data to and from memory 180. Memory channel 170 includes a last-level cache 171 for a first channel labelled "LLC0", a last-level cache 172 for a second channel labelled "LLC1", a memory controller 173, and a physical interface circuit 174 labelled "PHY" connected to memory 180. Last-level cache 171 is bidirectionally connected to SMU 111 over SMN 112 and has an upstream port bidirectionally connected to a downstream port of data fabric 160, and a downstream port. Last-level cache 172 is bidirectionally connected to SMU 111 over SMN 112 and has an upstream port bidirectionally connected to a downstream port of data fabric 160, and a downstream port. Memory controller 174 has a first upstream port bidirectionally connected to the downstream port of last-level cache 171, a second upstream port bidirectionally connected to the downstream port of last-level cache 172, and first and second downstream ports. Physical interface circuit 174 has a first upstream port bidirectionally connected to the first downstream port of memory controller 173, a second upstream port bidirectionally connected to the second downstream port of memory controller 173, and a downstream port bidirectionally connected to memory 180. As shown in FIG. 1, physical interface circuit 174 includes a training controller 175 whose operation will be described below.

In the illustrated implementation, memory 180 includes a set of DDR5 dual-inline memory modules (DIMMs) including a DIMM 181 and a DIMM 181. Each DIMM includes a set of DDR5 memory chips operating according to the DDR5 standard. In some implementations, DIMMs 181 and 192 are unbuffered DIMMs that support two channels labelled "CHA" and "CHB", as well as multiple ranks on each channel each with multiple memory chips per rank. In one example, each rank can have ten by-four (×4) memory chips in which eight memory chips store data forming a data width of ×32, and two memory chips store error correcting code (ECC) bits for the data. In other implementations, DIMMs 181 and 182 can be load reduction DIMMs (LRDIMMs) that include a register clock driver and a set of data buffers that buffer and redistribute signals between physical interface circuit 174 and individual memory chips in each of DIMM 181 and DIMM 182.

The bidirectional connection between physical interface circuit 174 and memory 180 includes signal groups as defined by the JEDEC DDR5 standard, including separate signals for each channel as well as shared control signals.

In operation, data processor 110 integrates a complex assortment of computing and storage devices that operate as memory accessing agents, including data processor core 120 and graphics controller 130, on a single chip. Most of these controllers are well known and will not be discussed further. Data processor 110 includes multiple internal buses for conducting data between these circuits at high speed. For example, data processor core 120 accesses data over a high-speed, 32-bit bus through an upstream port of data fabric 160. Data fabric 160 multiplexes accesses between any of a number of memory accessing agents connected to its upstream ports, and memory accessing responders connected to its downstream ports. Because of the large number of memory accessing agents and memory accessing responders, the number of internal bus lines is quite large as well and a crossbar switch in data fabric 160 multiplexes these wide buses to form virtual connections between the memory access requesters and the memory accessing responders.

The various processing nodes also maintain their own cache hierarchies. In a typical configuration, data processor core 120 includes four data processor cores each having its own dedicated level-one (L1) and level two (L2) caches, and having a level three (L3) cache shared between the four CPU cores in the cluster. In this example, last-level caches 171 and 172 would form level four (L4) caches, but regardless of the internal organization of the cache hierarchies in data processor core 120, they operate as the last-level caches in the cache hierarchy. In one example, last-level caches 171 and 172 implement inclusive caches, in which any cache line stored in any higher-level cache in data processor 110 will also be stored in them. In another example, last-level caches 171 and 172 are victim cache, and include cache lines each of which contained data that was requested by a data processor at an earlier point in time, but ultimately became the least recently used cache line and was evicted from all upper-level caches.

According to various implementations to be described here and in further detail below, data processor 110 stores parameters from BIOS memory 157 in a controller of memory controller 173 to allow it to perform power state change requests for memory 180 efficiently. On power-up, a designated CPU core in data processor core 120 loads instructions from BIOS memory 157 to start up the system. Among these instructions are instructions that allow training controller 175 to determine various timing and voltage parameters in the system. They also include instructions that allow memory controller 173 to efficiently implement memory power state change requests by leveraging the complexity of memory 180 to avoid stalling the issuance of mode register commands that a DDR5 memory chip and system uses to change power states. Thus, they improve the efficiency of power state change requests compared to known systems.

Figure 2:
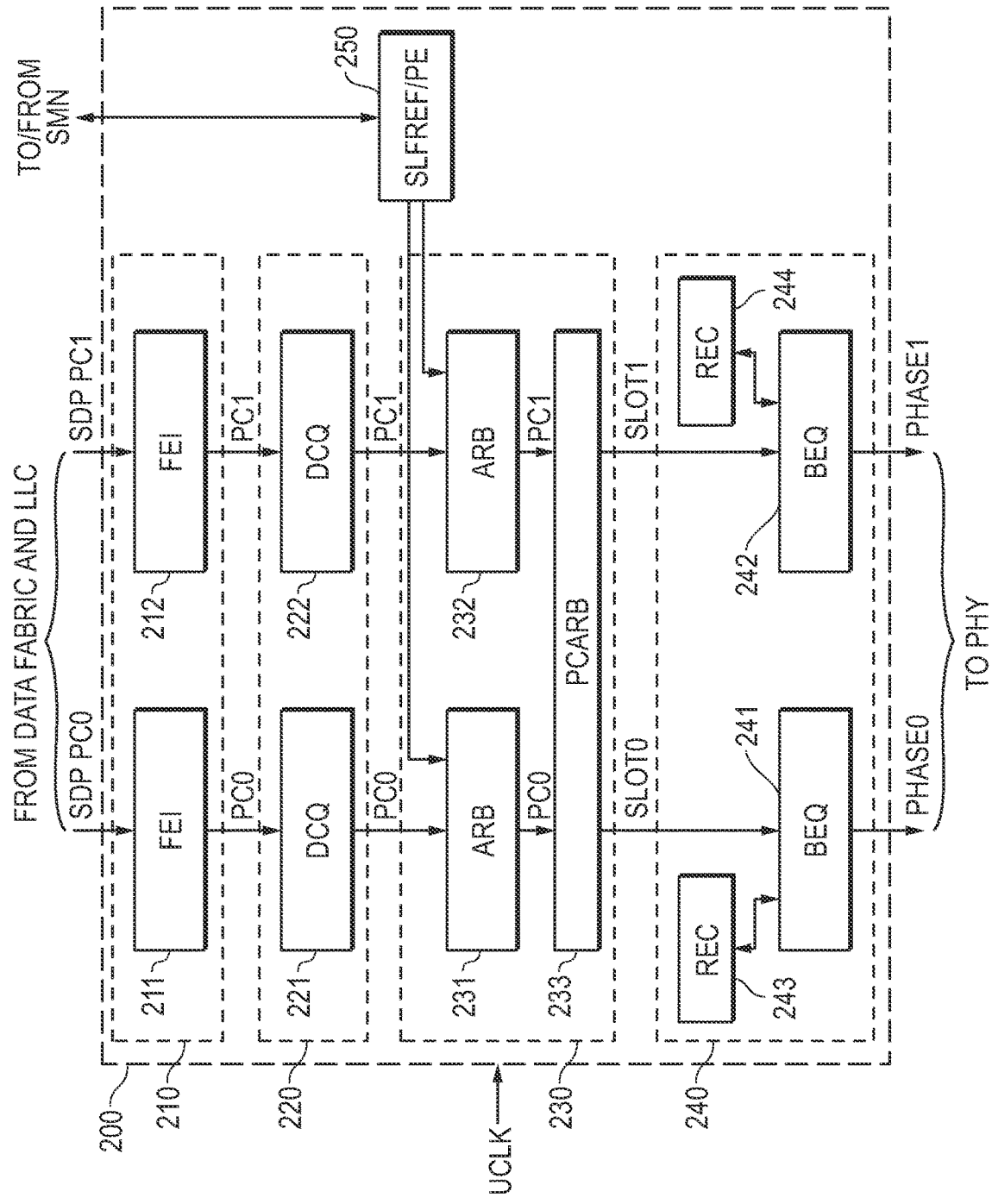
FIG. 2 illustrates in block diagram form a memory controller that can be used as the memory controller of FIG. 1 according to some implementations.

FIG. 2 illustrates in block diagram form a memory controller 200 that can be used as memory controller 173 of FIG. 1 according to some implementations. Memory controller 200 includes generally a front-end interface 210, a command queue 220 labelled "DCQ", an arbiter 230, a back-end queue 240, and a self-refresh state machine and power engine 250 labelled "SLFREF/PE".

Front-end interface 210 is a circuit that includes front-end interface circuits 211 and 212, each labelled "FEI". Front-end interface circuit 211 has an upstream port connected to the first downstream port of data fabric 160 through last-level cache 171, and a downstream port. In the implementation of FIG. 2, the upstream port uses an interface known as a scalable data port (SDP) and the upstream port is therefore labelled "SDP PC0", and the downstream port conducts memory access requests for pseudo channel 0 and is therefore labelled "PC0". Front-end interface circuit 212 has an upstream port connected to the second downstream port of data fabric 160 through last-level cache 172 labelled "SDP PC1", and a downstream port labelled "PC1".

Command queue 220 is a circuit that includes DRAM command queues 221 and 222, each labelled "DCQ". DRAM command queue 221 has an upstream port connected to the downstream port of front-end interface circuit 211, and a downstream port similarly labelled "PC0". DRAM command queue 222 has an upstream port connected to the downstream port of front-end interface circuit 212, and a downstream port similarly labelled "PC1".

Arbiter 230 is a circuit that includes arbiters 231 and 232, each labelled "ARB", and a pseudo-channel arbiter 233 labelled "PCARB". Arbiter 231 has a first upstream port connected to the downstream port of DRAM command queue 221, a second upstream port, and a downstream port similarly labelled "PC0". Arbiter 232 has a first upstream port connected to the downstream port of DRAM command queue 222, a second upstream port, and a downstream port similarly labelled "PC1". Pseudo channel arbiter 233 has a first upstream port connected to the downstream port of arbiter 231, a second upstream port connected to the downstream port of arbiter 232, a first downstream port labelled "SLOT0", and a second downstream port labelled "SLOT1". Arbiter 230 improves efficiency by intelligent scheduling of accesses to improve the usage of the memory bus. In general, arbiter 230 selects accesses from command queue 220 according to a set of arbitration rules. Arbiter 230 enforces proper timing relationships by determining whether certain accesses in command queue 220 are eligible for issuance based on DRAM timing parameters. Arbiter 230 uses decoded address information, timing eligibility information, and active page information to efficiently schedule memory accesses while observing other criteria such as quality of service (QoS) requirements. For example, arbiter 230 implements a preference for accesses to open pages to avoid the overhead of precharge and activation commands required to change memory pages, and hides overhead accesses to one bank by interleaving them with read and write accesses to another bank. During normal operation, arbiter 230 normally keeps pages open in different banks until they are required to be precharged prior to selecting a different page.

Back-end queue 240 is a circuit that includes back-end queues 241 and 242 each labelled "BEQ", and command replay queues 243 and 244 each labelled "REC". Back-end queue 241 has a first upstream port connected to the first downstream port of pseudo-channel arbiter 233, a second upstream port, and a downstream port connected to physical interface circuit 174 for providing signals for a first phase labelled "PHASE 0". Back-end queue 242 has a first upstream port connected to the second downstream port of pseudo-channel arbiter 233, a second upstream port, and a downstream port connected to physical interface circuit 174 for providing signals for a second phase labelled "PHASE 1". Command replay queue 243 has a downstream port bidirectionally connected to the second upstream port of back-end queue 241. Command replay queue 244 has a downstream port bidirectionally connected to the second upstream port of back-end queue 242.

Self-refresh state machine and power engine 250 has a bidirectional connection to SMN 112, a first output connected to the second input of arbiter 231, and a second output connected to the second input of arbiter 232. Self-refresh state machine and power engine 250 is a circuit that provides memory commands into the command stream of PC1 or PC2 such as mode register settings for different memory power states. In DDR5 SDRAMs, many settings that affect operation in the selected power states are set through corresponding mode registers. These are well-known from the DDR5 standard published by JEDEC. Because the supported clock frequencies can be very high, for example 3.2 gigahertz (GHz), the settings are important and have different values for each clock frequency.

The parameters can be identified in several different groups according to DDR5 features. The first group is known as the duty-cycle adjuster (DCA) group. When the DDR5 memory chips have a by-four (×4) data width, then fourteen mode registers, MR43, MR44, MR103, MR104, MR105, MR106, MR133, MR134, MR141, MR142, MR149, MR150, MR157, and MR158 need to be re-programmed for a power state change. That number increases to twenty-two mode registers when the memory chips have a by-eight (×8) data width, and forty-two registers when the DDR5 memory chips have a by-sixteen (×16) data width. There are several other mode register groups related to the decision-feedback-equalizer (DFE) input signal architecture, including groups for each of four DFE taps, a group for the DFE gain enable, and a group for data mask enables. The total number of registers whose settings need to be changed based for different operating frequencies is 39 for ×4 organizations, 67 for ×8 organizations, and 132 for ×16 organizations.

Memory controller 173, however, must observe the timing parameter $t_{MRW}$ when updating mode register values during a power state change. $t_{MRW}$ is the mode register set command delay and defines the minimum amount of time between the mode register set command by which the parameters are loaded into the mode registers in the accessed memory and any other command, including another mode register set command. For example, in the base DDR5 specification published by JEDEC, JESD79-5 (July 2020), $t_{MRW}$ is equal to 8 CK cycles or 5 nanoseconds (ns), whichever is greater. To program one ×16 memory chip for a new speed setting, therefore, would require a minimum of 132×10=1320 CK cycles. To program multiple ranks, the delay increases correspondingly.

Figure 3:
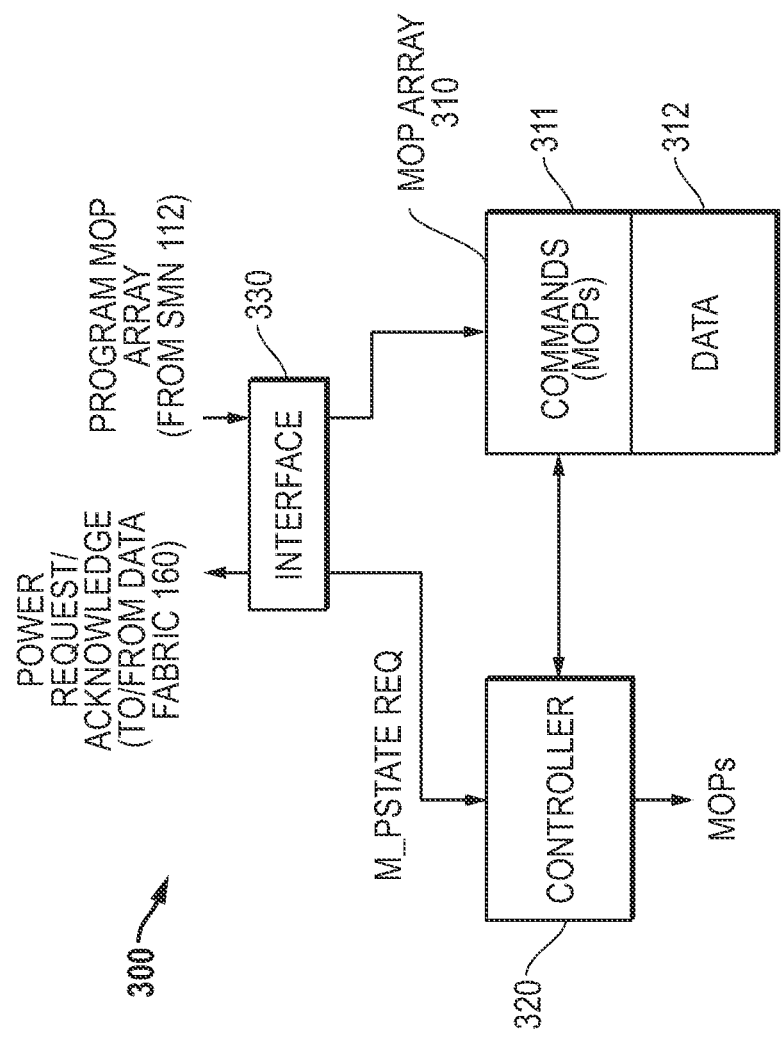
FIG. 3 illustrates in block diagram form a self-refresh state machine and power engine that may be used as the self-refresh state machine and power engine of FIG. 2 according to some implementations.

FIG. 3 illustrates in block diagram form a self-refresh state machine and power engine 300 that may be used as self-refresh state machine and power engine 250 of FIG. 2 according to some implementations. Self-refresh state machine and power engine 300 includes generally a memory operation (MOP) array 310, a controller 320, and an interface circuit 330.

Interface circuit 330 connects self-refresh state machine and power engine 300 to data fabric 160 to receive power state change commands from and provide power state change acknowledgments to SMN 112, and receives data to be programmed into MOP array 310. Interface circuit 330 has a first port bidirectionally connected to data fabric 160 as described above, and as shown in pertinent detail here has an input for receiving a power state change request signal labeled "POWER REQUEST" from data fabric 160, and an output for providing a power state change acknowledge signal labeled "POWER ACKNOWLEDGE" to data fabric 160, and a second port for receiving data to program MOP array 310 labelled "PROGRAM MOP ARRAY" from SMU 111 over SMN 112. Interface circuit 330 also has a second port with a first output for providing a memory power state change request signal labeled "M_PSTATE REQ", and a second output for providing data for storage in MOP array 310.

Controller 320 has an input connected to the first output of the second port of interface circuit 330, a bidirectional port, and an output for providing decoded MOPs to arbiter 231 or arbiter 232. Controller 320 is a circuit that reads and executes commands stored in MOP array 310 in a manner which will be described further below.

MOP array 310 has an input connected to the second output of the second port of interface circuit 330, and a bidirectional connection to controller 320. MOP array 310 is divided into a command portion 311 for storing MOPs, and a data portion 312 for storing data.

On startup, the BIOS stored in BIOS memory 157 of FIG. 1 queries memory 180 to determine the type of memory that has been installed and its organization. It typically does so by reading a small non-volatile memory chip on each DIMM present in the system. In the exemplary implementation, physical interface circuit 174 is configured to support DDR5 memory. In response to detecting the type and capabilities of memory installed in memory 180 and performing training using training controller 175, the system BIOS populates MOP array 310. MOP array 310 is programmed with a sequence of commands that initiate entry into and exit from supported low power modes for the particular type of memory in command portion 311, with values obtained during training in data portion 312. It does so by providing commands for writing to the mode registers of the DDR5 memory chips in an efficient order to reduce or eliminate channel stalling based on timing requirements.

In the illustrated implementation of FIG. 1, memory controller 173 operates according to the model described by the Advanced Configuration and Power Interface (ACPI) Specification. It supports various power states (e.g., P0, P1, P2, and P3) in the working (or D0) state of the memory, as well as various low power states (e.g., the D1, D2, and D3 states). According to the ACPI Specification, the working state of a device (such as memory controller 173 or memory 180) is known as the D0 or "fully on" state. The other states are low power states and include the D1, D2, and D3 states, in which the D3 state is the "off" state. Memory controller 173 is capable of making frequency and/or voltage changes within the D0 state and corresponding changes to the memory chips to operate at the speed corresponding to the selected P-state in the D0 state. It also controls placing memory 180 into lower power states corresponding to the available D states of memory controller 173.

Upon receipt of a POWER REQUEST, interface circuit 330 provides the M_PSTATE REQ signal to controller 320 to indicate which power state is requested. In response, controller 320 accesses MOP array 310 to execute a sequence of MOPs that place the memory chips in the appropriate states for the requested D state, and in particular, the appropriate power-state (P-state) within the D0 state. Controller 320 outputs indexes into command portion 311 of MOP array 310, and MOP array 310 returns encoded commands (MOPs) in response. In one example, controller 320 decodes and issues MOPs linearly from entries in command portion 311 with data from data portion 312, with no branching, until the first null entry is read from command portion 311. Many of these commands are mode register set (MRS) commands that use data values stored in data portion 312. For example, these data values can be specific settings for the large set of DDR5 mode registers that need to be programmed for the particular selected power state.

In particular, the BIOS in BIOS memory 157 stores a sequence of commands in MOP array 310 in an order such that consecutive memory operations that program different parameters of the same region of the memory in the selected power state are separated in the sequence by a number of cycles such that certain timing parameters are met and don't cause stalling. For example, the predetermined minimum timing parameter, such as the minimum time from mode register writes $t_{MRW}$.

For example, to guarantee that the commands exhibit this behavior and therefore can be programmed efficiently during power state change requests, the commands iterate in the hierarchical order of device, mode register, channel, and chip select. Assuming there are a sufficient number of devices and chip selects in the system to avoid stalling based on $t_{MRW}$, then controller 320 can iterate across the whole memory system without stalling. Expressed alternatively, controller 320 reduces the amount of stalling, if any, in a given system caused by waiting for $t_{MRW}$ to expire, and thereby provides efficient and quick memory power state changes.

Figure 4:
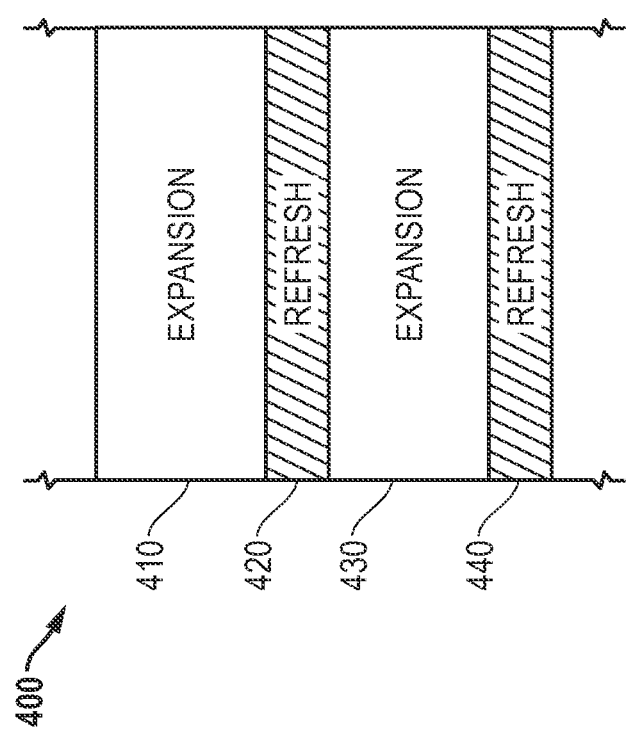
FIG. 4 illustrates a memory map showing the contents of the command portion of a memory operation array.

FIG. 4 illustrates a memory map 400 showing the contents of a command portion of a MOP array. As shown in FIG. 4, memory map 400 includes a representative portion including portions 410, 420, 430, and 440. Portion 410 includes a sequence of mode register write cycles labelled "EXPANSION". Portion 420 is a portion that provides refresh commands labelled "REFRESH". Portion 430 is another sequence of mode register write cycles similarly labelled "EXPANSION". Portion 440 is another portion that provides refresh commands similarly labelled "REFRESH". The system BIOS continues this pattern until the complete set of mode registers has been programmed for the new requested power state. Thus, BIOS needs to be aware of the refresh timing requirements as well as the number of cycles that correspond to a refresh interval, a timing parameter known as "$t_{REFI}$".

This technique of programming memory operation array 310 has a number of drawbacks. First, the interval of refresh commands in MOP array 310 can be estimated based on worst-case power state changes, but in that case, controller 320 performs unneeded refreshes for most typical power state changes. For example, if the number of refreshes interleaved with power state change commands were reduced, it would increase the risk of losing data when the capacitors in the memory cells lose too much charge by performing too few refreshes. Second, the amount of time required for power state changes will be increased, reducing the desirability of entry into and return from lower operating power states. Third, it requires the size of MOP array 310 to be increased to accommodate the additional refresh commands. Fourth, it avoids the need to change the allocation between refresh commands and expansions in the command portion of the MOP ARRAY if the refresh interval $t_{REFI}$ changes, such as when the temperature exceeds a high temperature threshold.

Figure 5:
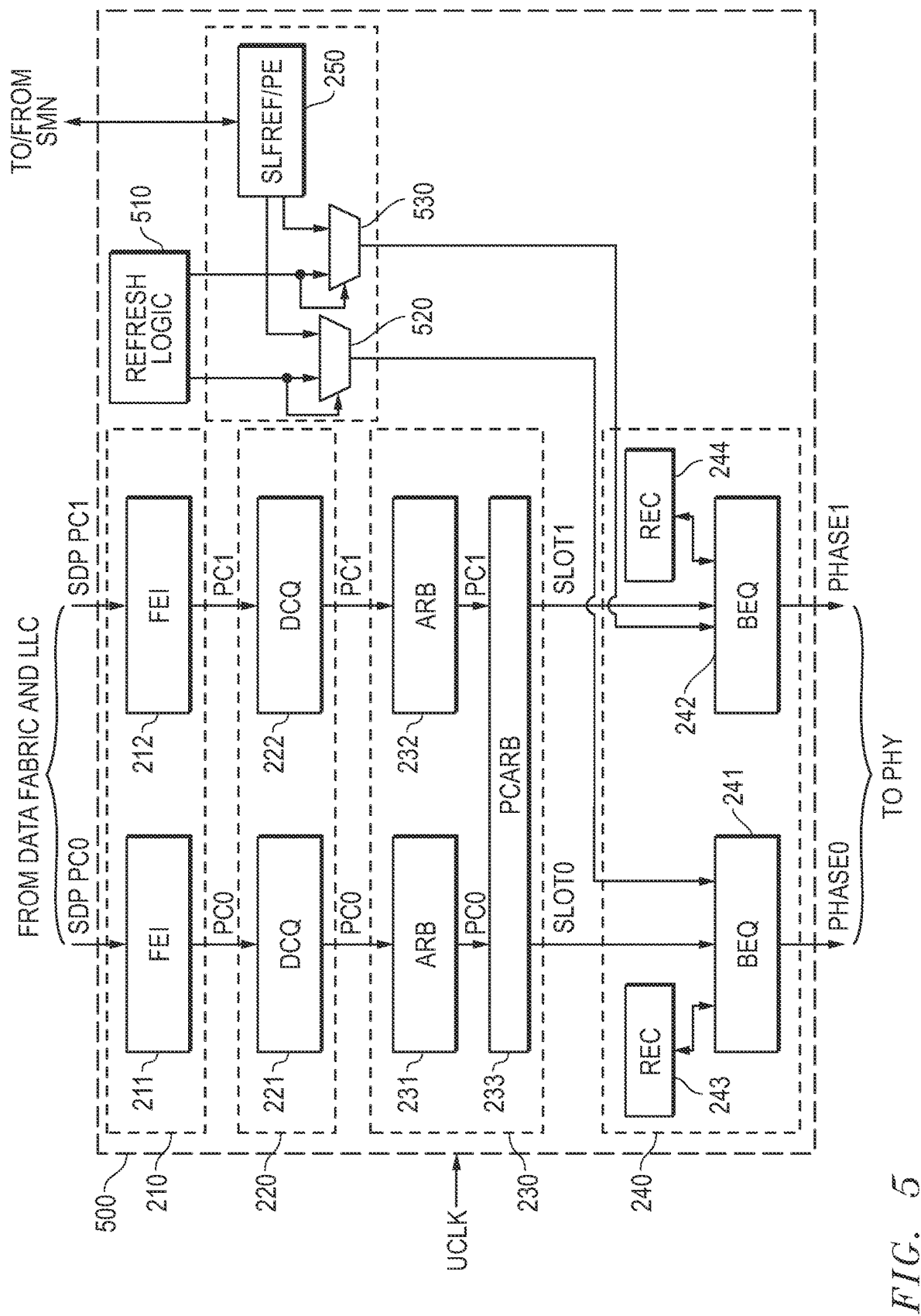
FIG. 5 illustrates in block diagram form a memory controller that provides efficient power state change operations that can be used as the memory controller of FIG. 1 according to some implementations.

FIG. 5 illustrates in block diagram form a memory controller 500 that provides efficient power state change operations that can be used as memory controller 173 of FIG. 1 according to some implementations. Memory controller 500 is similar to memory controller 200 of FIG. 2 but accommodates a more efficient technique of generating refresh operations during power state changes. Components of memory controller 500 that are common to those of memory controller 200 have the same reference numbers and operate as described above.

Memory controller 500 additionally includes a refresh logic circuit 510, a multiplexer 520 and a multiplexer 530. Refresh logic circuit 510 has a first output for providing refresh cycles for pseudo-channel 0, and a second output for providing refresh cycles for pseudo-channel 1. Multiplexer 520 has a first input connected to the first output of refresh logic circuit 510, a second input connected to a first output of self-refresh controller and power engine 250, and an output connected to a third input of back-end queue 241. Multiplexer 530 has a first input connected to the second output of refresh logic circuit 510, a second input connected to a second output of self-refresh controller and power engine 250, and an output connected to a third input of back-end queue 241.

Generally, refresh logic circuit 510 generates refresh commands based on the minimum refresh interval, i.e., the $t_{REFI}$ parameter. Refresh logic circuit 510 generates refresh commands at a rate that satisfies $t_{REFI}$ for the actual memory in the data processing system enumerated at startup, separated for each pseudo channel. The refresh commands include commands generated during a normal operation mode, i.e., when memory controller 200 is not performing a memory power state change, and commands that are generated in preparation for changing power states but before the programming of the mode registers has been completed. Multiplexers 520 and 530 together operate as a selector to multiplex these refresh commands with other commands, i.e., MOPs, generated to effectuate the power state change as described above.

In one example, the multiplexing scheme ensures that the refresh commands take precedence over any commands generated by self-refresh controller and power engine 250 during power state changes. Thus, a control signal that indicates a new, valid refresh command has been generated controls multiplexers 520 and 530 to select the first inputs thereof. It should be apparent that multiplexers 520 and 530 allow the interleaving of the refresh commands with the normal power state change commands, and may be implemented with more complex circuitry such as arbitration engines that measure the duration of commands and the latency of the refresh commands. Moreover, in other implementations, other functions may be multiplexed with the refreshes and MOPs.

When not making a power state change, back-end queues 241 and 242 select among commands present in DRAM command queues 221 and 222, respectively, and refresh commands received on the second inputs thereof. In some implementations, refresh logic circuit 510 can provide "normal" refresh requests that back-end queues 241 and 242 advantageously interleave with normal memory access commands, as well as "urgent" refresh requests that take precedence over all other memory access requests. In one example, in response to receiving a power state change request, memory controller 500 stalls all commands in DRAM command queues 221 and 222 from issuance until the power state change request is completed. In another example, memory controller 500 stalls the reception of new memory access requests into DRAM command queues 221 and 222 by signaling back-pressure on the ports of data fabric 160, while draining existing commands from DRAM command queues 221 and 222 before beginning the power state transition.

Figure 6:
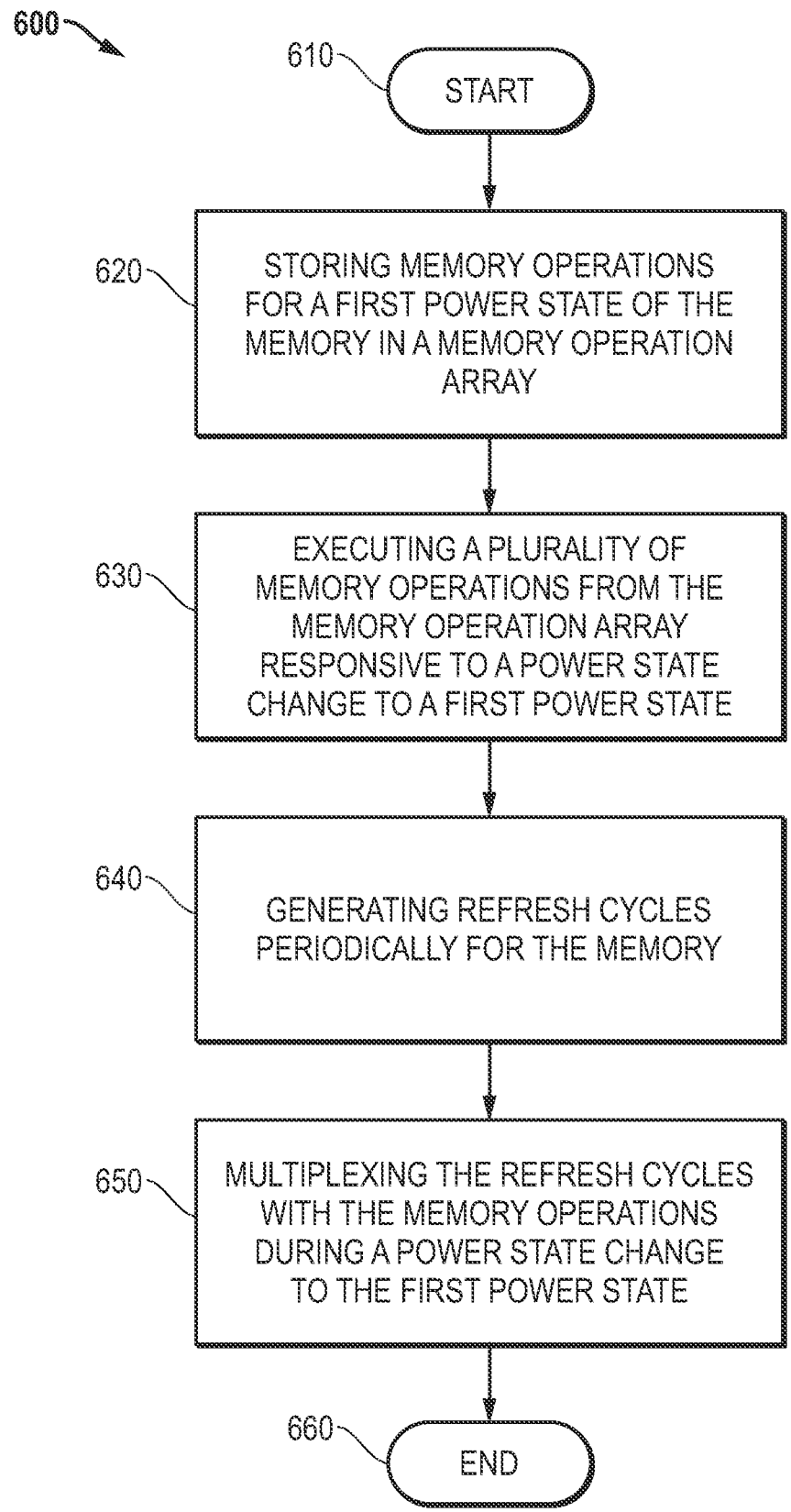
FIG. 6 is a flow chart illustrating a process of performing refresh during a power state change according to some implementations.

FIG. 6 is a flow chart illustrating a process 600 of performing refresh during a power state change according to some implementations. Process 600 starts in an action box 610. For example, the data processing system could startup and start executing instructions from system BIOS memory 157 before passing control to the operating system. At some point, the system BIOS stored in BIOS memory 157 enumerates all the memory present in the data processing system and starts populating MOP array 310 in response to the type and configuration of the memory. Action box 620 includes storing memory operations for a first power state of the memory in a memory operation array. Action box 620 could include training controller 175 conducting training operations to obtain values for certain operating parameters for each power state, and the BIOS in BIOS memory 157 subsequently to program MOP array 310 according to the supported power states and using the mode registers for the particular memory type used. Action box 630 includes executing a plurality of memory operations from the memory operation array responsive to a power state change request to the first power state. For example, action box 630 could occur during operation in which a memory power state is changed in response to system activity. The memory operations include mode register set commands to program the mode registers according to the memory operating speed while using certain values obtained during training. Action box 640 includes generating refresh cycles periodically for the memory. In the example shown, refresh logic circuit 510 generates refresh commands periodically to satisfy the $t_{REFI}$ parameter, that is, so that all memory cells in all memory chips in the memory system are refreshed often enough to preserve their contents. Action box 650 includes multiplexing the refresh cycles with the memory operations during a power state change to the first power state. In the example shown in FIG. 5, multiplexers 520 and 530 immediately allows refresh cycles to interrupt the memory operations generated by self-refresh state machine and power engine. Process 600 ends in an action box 660, for example, after controller 320 executes all memory operations used for the memory power state change request. Subsequently, flow may resume at action box 630.

While particular implementations have been described, various modifications to these implementations will be apparent to those skilled in the art. For example, the techniques described above can be used advantageously with DDR5 DRAM or other memory types that require training and mode register programming sequences that are long enough to require refresh sequences. While the exemplary DDR5 DRAM implements pseudo channels, the disclosed techniques are useful for non-pseudo channel memory as well. The techniques described above are applicable to systems that have only a single rank of memory or multiple ranks. The size and organization of the command portion of the MOP array can vary between different implementations. The number of operating power states supported can vary between implementations. The memory controller can also take various actions during power state change requests such as allowing existing memory access requests to be issued while not storing additional memory access requests in the command queue or queues, thereby draining the command queue or queues, or all memory access requests can be stalled until the power state change is completed.

Accordingly, it is intended by the appended claims to cover all modifications of the disclosed implementations that fall within the scope of the disclosed implementations.

What is claimed is:

1. A data processor operable to be coupled to a memory, comprising:
   a memory operation array for storing memory operations for a first power state of the memory;
   a controller responsive to a power state change request to execute a plurality of memory operations from the memory operation array when the first power state is selected;
   a refresh logic circuit that generates refresh cycles periodically for the memory; and
   a selector for multiplexing the refresh cycles with the memory operations during a power state change to the first power state.

2. The data processor of claim 1, wherein the refresh logic circuit is operative to generate the refresh cycles according to a predetermined refresh interval.

3. The data processor of claim 2, wherein the refresh logic circuit selectively adjusts the predetermined refresh interval in response to a temperature.

4. The data processor of claim 1, wherein the selector prioritizes generation of the refresh cycles over the plurality of memory operations during a power state change.

5. The data processor of claim 1, wherein the refresh logic circuit further generates the refresh cycles during a normal operation mode.

6. The data processor of claim 5, further comprising:
   a command queue for storing a plurality of memory access requests from at least one memory accessing agent;
   an arbiter for selecting memory access requests from the command queue according to a plurality of arbitration rules; and
   a back-end queue for selecting memory access requests from the arbiter and memory operations from the selector.

7. The data processor of claim 1, wherein the controller is operable to perform an expansion of the plurality of memory operations in the memory operation array in response to at least one of: a number of channels, a number of ranks, a number of devices, and a number of mode registers for a plurality of memory devices of the memory.

8. A data processing system, comprising:
   a data processor; and
   a memory coupled to the data processor,
      wherein the data processor comprises: a memory operation array for storing memory operations for a first power state of the memory;
      a controller responsive to a power state change request to execute a plurality of memory operations from the memory operation array when the first power state is selected;
      a refresh logic circuit that generates refresh cycles periodically for the memory; and
      a selector for multiplexing the refresh cycles with the memory operations during a power state change to the first power state.

9. The data processing system of claim 8, wherein the refresh logic circuit is operative to generate the refresh cycles according to a predetermined refresh interval.

10. The data processing system of claim 9, wherein the refresh logic circuit selectively adjusts the predetermined refresh interval in response to a temperature.

11. The data processing system of claim 8, wherein the selector prioritizes generation of the refresh cycles over the plurality of memory operations during a power state change.

12. The data processing system of claim 8, wherein the controller is operable to perform an expansion of the plurality of memory operations in the memory operation array in response to at least one of: a number of channels, a number of ranks, and a number of mode registers for a plurality of memory devices of the memory.

13. The data processing system of claim 8, wherein the memory comprises at least one double data rate (DDR) version five (DDR5) memory chip.

14. The data processing system of claim 8, further comprising an initialization circuit, wherein the initialization circuit comprises:
   a data processor core;
   a basic input/output system memory; and
   a training controller,
      wherein instructions stored in the basic input/output system memory cause the data processor core to initiate a training operation of the memory using the training controller, and to populate a data portion of the memory operation array in response to the training operation and a configuration of the memory.

15. The data processing system of claim 14, wherein the initialization circuit further populates the data portion with parameters for at least one additional power state such that consecutive memory operations that program different parameters of a first region of the memory in the at least one additional power state are separated in a sequence by an amount corresponding to a predetermined minimum timing parameter.

16. The data processing system of claim 8, wherein the memory operations comprise mode register set commands.

17. A method for accessing a memory, comprising:
   storing memory operations for a first power state of the memory in a memory operation array;
   executing a plurality of memory operations from the memory operation array responsive to a power state change request to the first power state;
   generating refresh cycles periodically for the memory; and
   multiplexing the refresh cycles with the memory operations during a power state change to the first power state.

18. The method of claim 17, wherein generating the refresh cycles periodically for the memory comprises generating the refresh cycles according to a predetermined refresh interval.

19. The method of claim 18, further comprising selectively adjusting the predetermined refresh interval in response to a temperature.

20. The method of claim 17, further comprising prioritizing the refresh cycles over the plurality of memory operations during a power state change.

* * * * *